United States Patent [19]

Leroy et al.

[11] Patent Number: 5,732,746
[45] Date of Patent: Mar. 31, 1998

[54] MULTILAYER PIPE AND DIE FOR MANUFACTURING IT

[75] Inventors: Jean-Marie Leroy, Feillens; Alain Courant, Manziat, both of France

[73] Assignee: Etablissements Courant SA, Manziat, France

[21] Appl. No.: 454,309

[22] PCT Filed: Dec. 28, 1993

[86] PCT No.: PCT/FR93/01311

§ 371 Date: Aug. 22, 1995

§ 102(e) Date: Aug. 22, 1995

[87] PCT Pub. No.: WO94/15130

PCT Pub. Date: Jul. 7, 1994

[30] Foreign Application Priority Data

Dec. 29, 1992 [FR] France ................... 92 16043

[51] Int. Cl.$^6$ ............................................. F16L 11/08
[52] U.S. Cl. .................. 138/123; 138/124; 138/125; 138/137; 138/109
[58] Field of Search ........................ 138/123–127, 138/137, 177, 109

[56] References Cited

U.S. PATENT DOCUMENTS

| | | |
|---|---|---|
| 3,578,028 | 5/1971 | Roberts ........................ 138/123 |
| 3,755,032 | 8/1973 | Higbee. |
| 3,828,112 | 8/1974 | Johansen et al. ............ 138/126 X |
| 3,977,440 | 8/1976 | Phillipi. |
| 4,044,799 | 8/1977 | Higbee et al.. |
| 4,275,768 | 6/1981 | Riggs et al. ................. 138/125 X |
| 4,308,895 | 1/1982 | Greco. |
| 4,553,568 | 11/1985 | Piccoli et al. ................ 138/125 |
| 4,601,928 | 7/1986 | Van Der Velden ......... 138/125 X |
| 4,679,599 | 7/1987 | Newberry et al. .......... 138/125 X |
| 4,989,643 | 2/1991 | Walton et al. ............... 138/125 X |
| 5,232,645 | 8/1993 | Ramos, Jr. .................. 138/125 X |

FOREIGN PATENT DOCUMENTS

| | | |
|---|---|---|
| 1125742 | 8/1968 | United Kingdom. |
| 1449753 | 9/1976 | United Kingdom. |

*Primary Examiner*—Patrick F. Brinson
*Attorney, Agent, or Firm*—Oliff & Berridge, P.L.C.

[57] ABSTRACT

A multilayer pipe is comprised of an internal tubular ply made from a synthetic material, a strengthening reinforcement member also made from a synthetic material and an external ply made from a synthetic material. At least one of the plies is bonded, by melting, to the reinforcement member. The strengthening reinforcement member has, over the whole or part of its length, a reticulate lacunary structure, of which only internal and external faces thereof are bonded to corresponding adjacent plies. Spaces of the lacunary structure are blocked off by, but not filled by, these plies.

9 Claims, 7 Drawing Sheets

MULTILAYER PIPE AND DIE FOR MANUFACTURING IT

BACKGROUND OF THE INVENTION

The invention relates to the technical field of pipes used for transporting gases, fluids, such as water, rainwater, or waste water, but also as a protective sheath, for various mains or conductors. It also relates more especially to pipes having a diameter lying between 30 and 1000 mm.

Currently, most pipes of this type are produced from cast iron, steel, cement, or from very thick synthetic material, in order to have the desired strength. All these pipes have either the disadvantage of possessing a high weight per linear meter or, when they are made from polyvinyl chloride, of polluting the environment, since they contain chlorine.

Multilayer pipes are also known which, produced from composite materials, that is to say from materials of different type, have the disadvantage of requiring, in order to manufacture them, tools which are complicated, expensive and difficult to adjust.

This is the case with multilayer pipes described in GB-A-1,449,753, U.S. Pat. No. 3,977,440 and U.S. Pat. No. 4,044,799 which, being composed of an internal tubular ply, a strengthening reinforcement member having a lacunary structure or otherwise, and an external tubular ply, bond the reinforcement member to at least one of the plies by embedding it, by melting, in the external ply. The enhancement of the mechanical characteristics of the pipes thus obtained is largely counterbalanced by an increase in the weight of the pipe, increasing the amount of deflection when the pipe is laid between two supports. To these disadvantages, limiting the application of this manufacturing technique to pipes of diameters less than 100 mm, should be added those inherent in the manufacturing means which, requiring several stations and occasionally several injection heads, are expensive, complicated and tricky to adjust.

SUMMARY OF THE INVENTION

The object of the present invention is to overcome these disadvantages by providing an impermeable and strong multilayer pipe which has a low weight per linear meter and can be produced in nonpolluting materials which may or may not incorporate recovery products.

For this purpose, in the multilayer pipe according to the invention, the strengthening reinforcement member has, over the whole or part of its length, a lacunary structure which is reticulated, only the respectively internal and external faces of which are bonded to the adjacent plies and the lacunary spaces of which are blocked off, but not filled, by these plies.

This pipe offers the particular feature of possessing a central lacunary reinforcement member forming a brace between the adjacent plies and to which these plies are attached in order to form a perfectly impermeable, lightweight and strong tubular body.

According to the embodiments, the reinforcement member and its plies are produced in the same synthetic material or in synthetic materials of different types or colors, coming as virgin granules or mixed with recycling products.

In one embodiment, the reinforcement member made from synthetic material having a lacunary structure is locally replaced by a uniform layer of a substance which can be used to form a bellmouth for joining two lengths of pipe.

The invention also relates to the die for the manufacture of such a multilayer pipe.

For this purpose, this die comprises, going from the inside to the outside:
- on the one hand, a first extrusion assembly forming the inner ply and composed of an axial core delimiting, with a sleeve surrounding it, an annular channel joined, upstream, to a material supply channel and running out, via its downstream end, toward a chilled sizing-die unit;
- on the other hand, a second extrusion assembly forming the lacunary-structure reinforcement member and composed of two sleeves surrounding the first extrusion assembly, and forming a second annular channel communicating, upstream, with a second material supply channel and, downstream, with an extrusion annulus, at least one of these sleeves including, at its downstream end, notches interacting with the annulus, this sleeve being connected to means capable of moving it in relation to the other sleeve in order to alter the cross-section of this annulus,
- and, in addition, a third extrusion assembly forming the outer ply and composed of a fixed bush, placed around the second extrusion assembly and delimiting, with an internal bore made in the die head, a third annular channel, the upstream end of which communicates with a third material supply channel, whereas its downstream end runs out toward the lacunary reinforcement member pressed against the inner ply.

Such a die makes it possible to produce continuously the lacunary-structure reinforcement member and the two, respectively inner and outer, adjacent plies, sandwiching this reinforcement member, being pressed against it and being bonded to it during the cooling.

The three material supply channels may be joined to the same extruder or to three different extruders. This independence also enables only two of the supply channels to be fed, for example the first and the second supply channel or the second and third channel, in order to form a pipe which includes only one inner ply or only one outer ply associated with the reinforcement member.

BRIEF DESCRIPTION OF THE DRAWINGS

Characteristics and advantages of the invention will become apparent from the description which follows, with reference to the appended diagrammatic drawing representing, by way of nonlimiting example, an embodiment of the multilayer pipe and an embodiment of the die for manufacturing it.

DETAILED DESCRIPTION OF PREFERRED EMBODIMENTS

Figure 1:
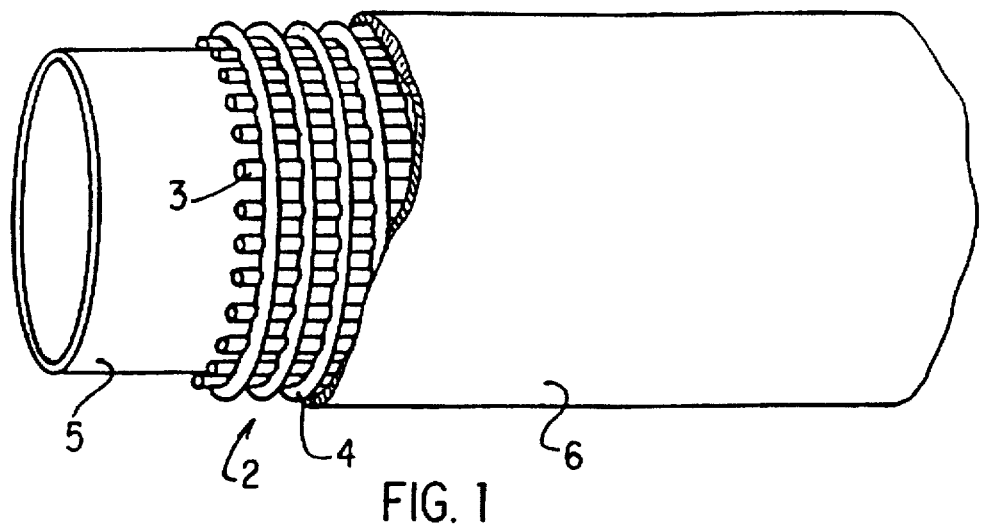
FIG. 1 is a partial perspective view with cut-away, showing an embodiment of the multilayer pipe.
Figure 2:
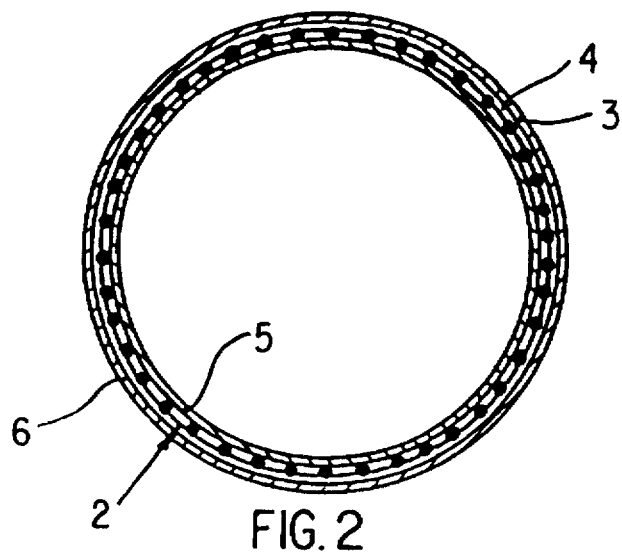
FIG. 2 is a transverse sectional side view.

In FIG. 1, the designation 2 denotes a lacunary-structure reinforcement member made from synthetic material and including, in a known way, a meshed structure delimited by longitudinal filaments or strands 3 and circular rings 4, these being bonded to the former ones at regular intervals. The designation 5 denotes an inner ply made from synthetic material, whereas the designation 6 denotes an outer ply, also produced from synthetic material.

In order to understand the invention, it is specified that the expressions inner ply and outer ply denote the plies delimiting the wall of the pipe and, depending on the embodiments, these may or may not be adjacent to the central lacunary reinforcement member, or to one of the lacunary reinforcement members of the pipe.

As indicated in the preamble, the material making up the reinforcement member 2 and the material making up the plies 5 and 6 may be identical or be different in their type, their color, or in any other characteristic. In particular, one of the three aforementioned layers may be produced in recovery materials. Preferably, and in order to avoid any pollution, the three layers are produced in polyolefins, for example polyethylene, which may or may not be recovered.

Owing to its structure, and especially by virtue of the reinforcement member 2 sandwiched between the two plies 5 and 6, of small thickness and to which plies the armature is bonded, this pipe has a very high rigidity.

In addition, and by virtue of the placing of the plies 5 and 6 against and on either side of the lacunary reinforcement member, without filling the meshes thereof, the composite pipe thus obtained is very much lighter than the traditional pipes made from cast iron, cement or made from extruded synthetic material.

Figure 3:
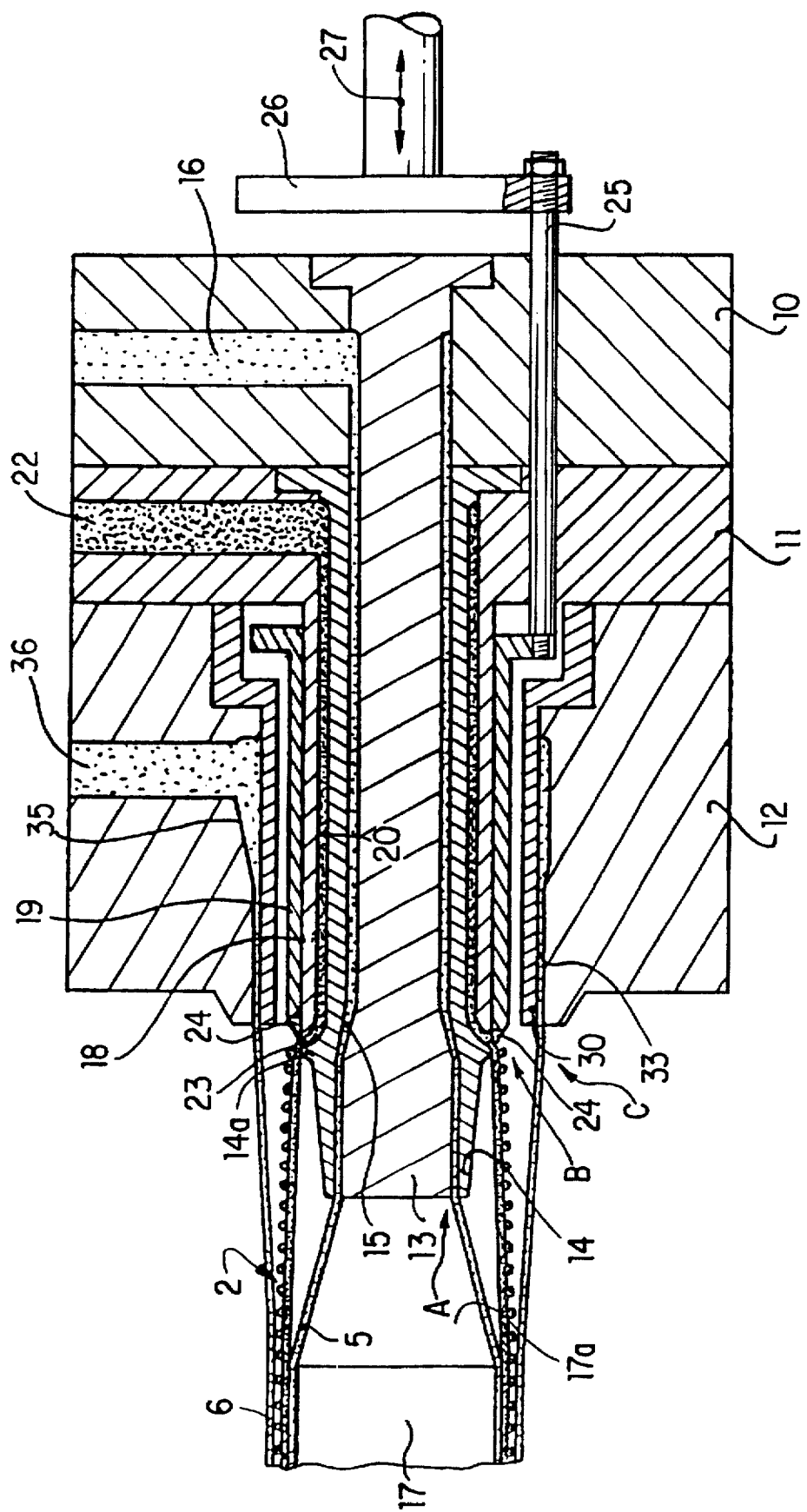
FIG. 3 is a longitudinal sectional view of an embodiment of the die enabling the multilayer pipe shown in FIG. 1 to be manufactured.

This pipe is manufactured continuously by means of a die, one embodiment of which is shown in FIG. 3. In this figure, the designations 10 and 11 denote die body elements and 12 the die head. These elements are linked together and attached to the stand of an extrusion installation, which is not shown.

According to the invention, this die comprises a first extrusion assembly A forming the inner ply 5, a second extrusion assembly B forming the lacunary-structure reinforcement member 2 and a third extrusion assembly C forming the outer ply 6.

The first extrusion assembly A is composed of an axial core 13 and a central sleeve 14 surrounding it. The core 13 is attached to the body 10 by its upstream end. It delimits, with the internal bore of the sleeve 14, an annular channel 15 which extends over its entire length and is joined, upstream, to a first material supply channel 16. The annular channel 15 emerges, downstream, in proximity to the convergent element 17a of a chilled sizing-die unit 17, fixed in the extension of the die, in order to cool and to shape the exiting tubular ply 5.

The second extrusion assembly B is constituted by the aforementioned central sleeve 14, by an intermediate sleeve 18 surrounding it and fastened to the body 11, and by a sleeve 19 for forming the lacunae, this sleeve being mounted so as to slide over the outer part of the intermediate sleeve 18. The sleeves 14 and 18 delimit between them a second annular channel 20 communicating, upstream, with a second feed channel 22 and emerging, downstream, via an annulus 23. In a known way, this annulus is formed between a flange 14a of the sleeve 14 and the downstream beveled end of the intermediate sleeve 18. It emerges radially toward the outside.

The sleeve 19 includes, at its free end, notches 24. It is connected, via a linkage 25 passing through the bodies 10 and 11, to a drive plate 26 placed outside the die and itself connected to motor means capable of moving it longitudinally and alternately in the two directions, as shown by the arrow 27.

In this embodiment, the sleeve 19 can occupy two positions, namely:

a downstream partially occulting position, shown in the lower part of FIG. 3, in which its notches 24 are in the exit plane of the annulus 23 in order to form the longitudinal strands 3 of the lacunary structure;

and an upstream totally clear position, shown in the upper part of FIG. 3, in which it is moved upstream, enabling the material to exit over the entire periphery of the annulus 23 in order to form, depending on the time for which it is held in this position, a ring 4 for strengthening the strands 3, or a continuous layer of material.

This continuous layer of material, which is locally substituted for the lacunary layer, strengthens the pipe in the zones where it has to undergo a bellmouthing operation, that is to say to be deformed radially in order to have a bellmouth which makes it easier to join two pipes by fitting into each other.

The third extrusion assembly C is composed of an outer sleeve 30, fastened to the die head 12 and delimiting, by its outer face and with a bore, made in this head, a third annular channel 33. This channel is joined to an upstream feed chamber 35, itself connected up to a third material feed channel 36. The downstream end of the annular channel 33 emerges toward the sizing-die unit 17 and thus enables the outer ply 6 to be laid down over the reinforcement member 2, itself bearing on the inner ply 5 which flows over the sizing-die unit.

FIG. 3 shows that the inner bore of the outer bush 30 is distinctly further away radially from the blocking-off bush 19 so as not to obstruct the latter's movements.

It is easy to imagine that the three layers exiting the die and bearing on the sizing-die unit 17 have not yet reached their solidification temperature and that, because of this, they may be bonded to each other without addition of any other bonding agent.

The feed channels 16–22 and 36 may be joined to the same extruder or to several extruders, which makes it possible to produce, using this die, pipes having layers made from synthetic material of the same type or of different types, and this is so depending on the requirements and constraints pertaining to the use of this pipe.

Recourse to different extruders also enables recovery plastics to be used in order to constitute, for example, the least visible or the least stressed layer, preferably the lacunary reinforcement member.

Figure 4:
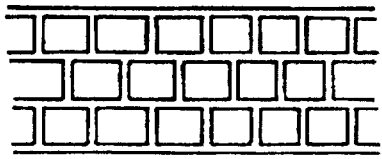
FIGS. 4 to 6 are partial front views showing other embodiments of the reinforcement member.
Figure 5:
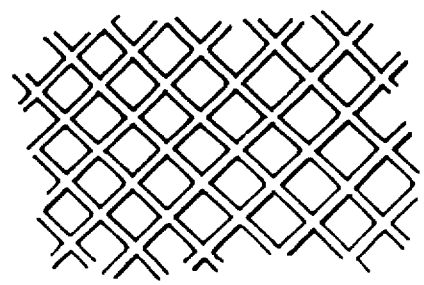
Figure 6:
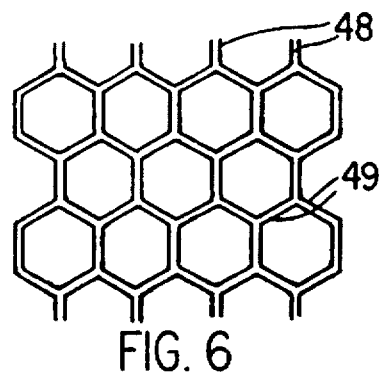

The lacunary structure forming the reinforcement member 2 may have mesh cells other than those shown in FIG. 1, for example staggered square mesh cells, diamond-shaped mesh cells or honeycomb-shaped mesh cells, as shown in FIGS. 4, 5 and 6.

The staggered square mesh cells are obtained by an alternative form of the device of FIG. 3, including means, not shown, for pivoting the plate 26, the linkage 25 and the sleeve 19 about the longitudinal axis of the die. This rotation, the angular amplitude of which has a value substantially equal to half the width of one mesh cell, is performed, in one direction or the other, while the sleeve 19 is in the upstream position for clearing the annulus 23. It is obvious that, under these conditions, the linkages 25 pass through the bodies 10 and 11 of the die via slots, in the form of a circular arc or in another form, leaving them with the clearance necessary for this rotation.

Figure 7:
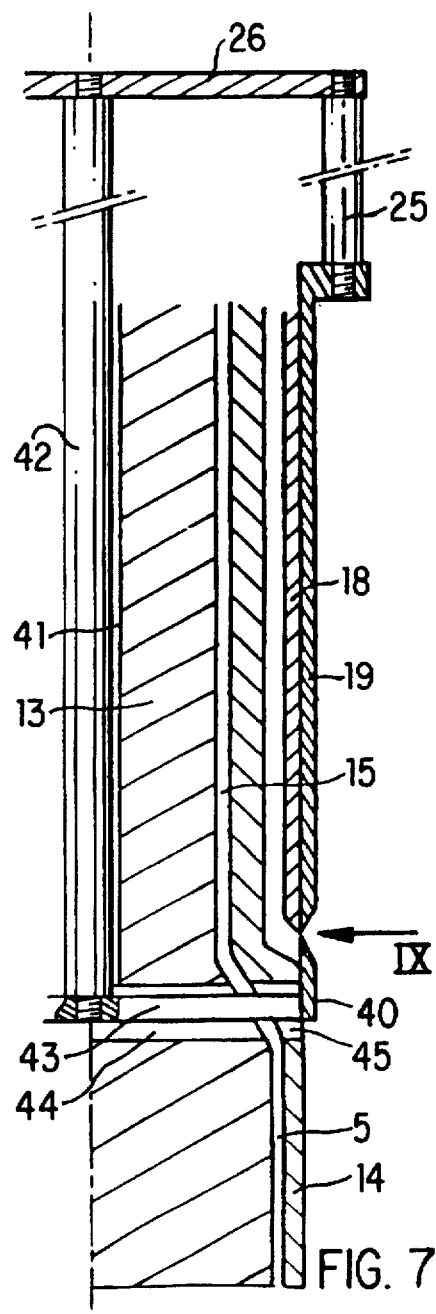
FIGS. 7 and 8 are partial sectional views showing alternative embodiments of the die of FIG. 3.
Figure 8:
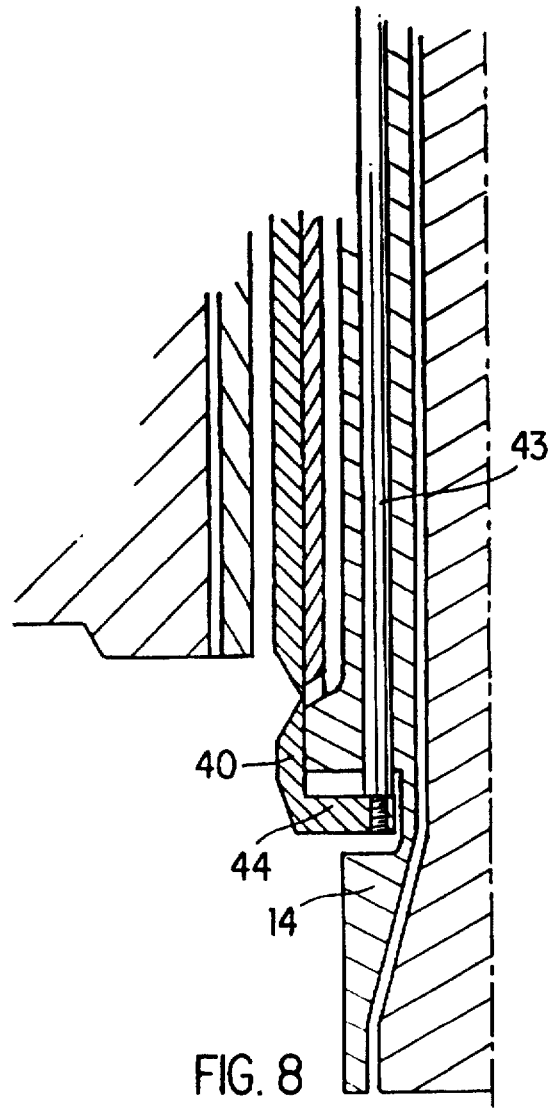

FIGS. 7 and 8 show alternative embodiments of the die of FIG. 3, these alternative forms enabling diamond-shaped or honeycomb-shaped mesh cells to be produced.

In both these alternative forms, the sleeve 19 for forming the lacunae is associated with a sleeve 40 which, placed downstream of it, is linked to the means 25 to 27 which move this bush.

In FIG. 7, this link is provided by an axial rod 42, linked to the plate 26 and mounted so as to move freely in translation in a bore 41 of the core 13, and by radial arms 43 placed, with clearance, in radial slots 44 and 45 of, respectively, the core 13 and sleeve 14. The arms 43, which cut the annulus 15 and consequently the path of the material making up the layer 5, have, in transverse cross-section, a sharp-edged lamellar profile in order to reduce to a minimum their effect on the flowing material. Of course, downstream of this perturbation zone, the annulus 15 includes a compression zone enabling the material to absorb the splitting produced by the arms and to reform a uniform ring.

In the alternative embodiment of FIG. 8, the sleeve 40 is linked to the plate 26 (FIG. 3) by tie rods 43 mounted so as to slide vertically in the sleeve 14 and linked to an internal collar 44 of this sleeve.

Figure 9:
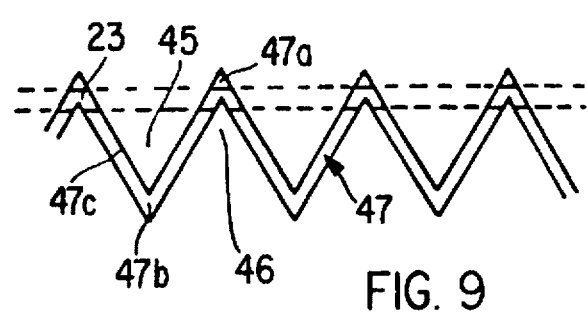
FIG. 9 is a partial front view along the arrow IX of FIG. 7, showing, on an enlarged scale, the jagged slit.

In both these embodiments, and as shown in FIG. 9, the facing edges of, respectively, the sleeve 19 and the sleeve 40 are equipped with imbricating dentations, respectively 45 and 46, and formed by triangular teeth separated by "V"-shaped notches and delimiting between them a jagged slit 47.

During the production of the lacunary structure of the reinforcement member 2, the sleeve 19 and the sleeve 40 are simultaneously set into a motion of longitudinal movement, alternately downstream and then upstream, so as to move the jagged slit 47 made between the two dentations between a downstream position, shown in FIG. 9, in which what may be called the crest 47a of the teeth of the jagged slit 47 is in the region of the annulus 23 and an upstream position in which it is the roots 47b which are in the region of this annulus. Between these two positions, the material exiting via the annulus 23 is distributed over the branches 47c between crests and roots and thus forms the diamond-shaped mesh shown in FIG. 5.

The honeycomb-shaped mesh cells, shown in FIG. 6, are obtained by one or other of the dies of FIGS. 7 and 8, temporarily stopping the longitudinal movement of the sleeves 19 and 40 at each of the ends of their travel in order to form, as shown in FIG. 6, bars 48 connecting the strands 49 formed by the branches 47c of the jagged slit 47.

Figure 10:
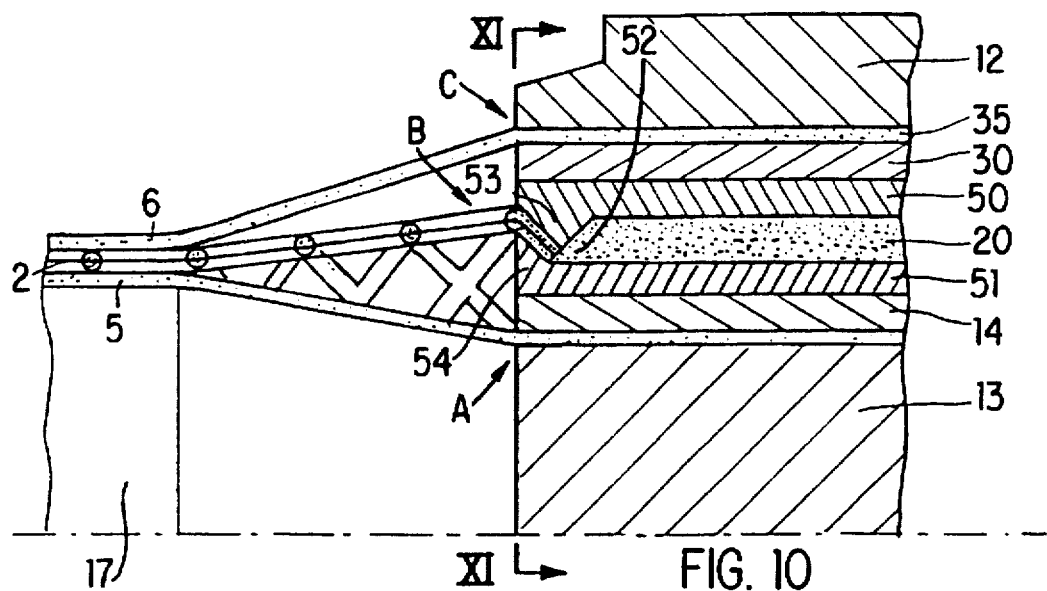
FIG. 10 is a partial side and sectional view showing another embodiment of the die.
Figure 11:
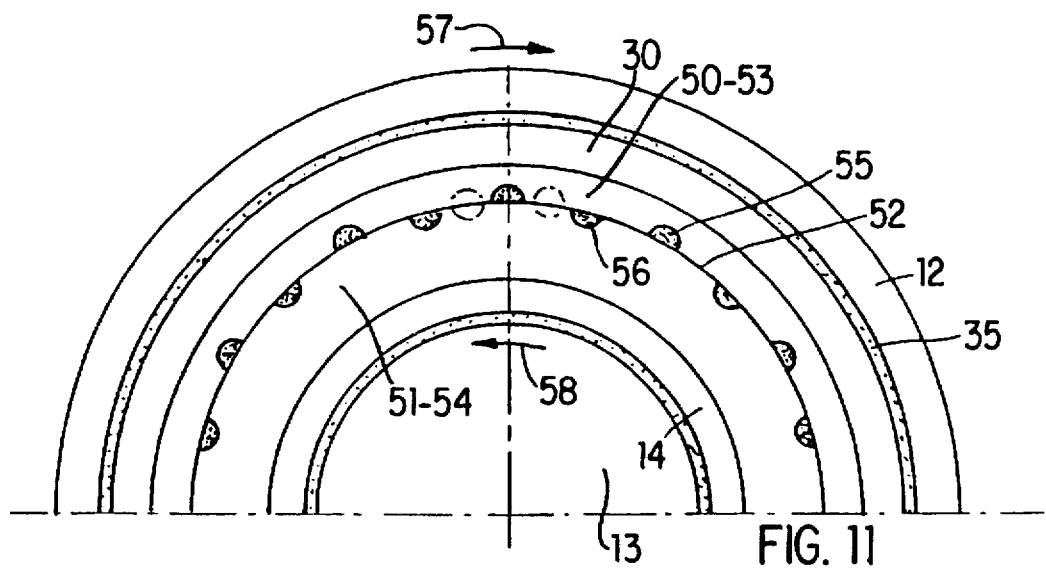
FIG. 11 is a partial sectional view along XI—XI of FIG. 10, showing, on an enlarged scale, the extrusion slit of the die assembly B of FIG. 10.

FIGS. 10 and 11, and 13 and 14, show two other embodiments of the second extrusion assembly B, enabling lacunary structures with diamond-shaped mesh cells to be obtained. In FIGS. 10 and 11, the assembly B is composed of two coaxial sleeves 50, 51 delimiting between them the second annular channel 20. The extrusion annulus 52 is delimited between two divergent frustoconical bearing surfaces made on extreme and downstream flanges 53 and 54 of, respectively, the sleeve 50 and the sleeve 51. Radial notches 55 and 56 (FIG. 11), angularly spaced with the same angular spacing, emerge into each of the conical bearing surfaces.

Figure 12:
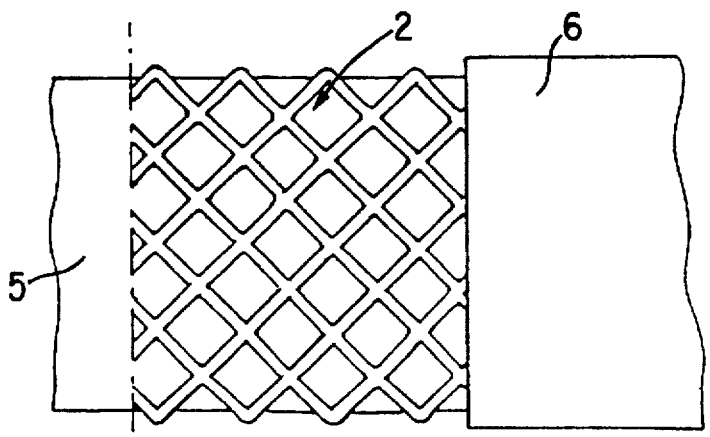
FIG. 12 is a partial plan view, from above, of the pipe obtained using this die.

Each of the two sleeves 50 and 51 is connected to means, which are not shown but are known to the person skilled in the art, capable of pivoting it in the reverse direction of the other sleeve and, for example, and as shown in FIG. 11, in the direction of the arrow 57 for the sleeve 50 and in that of the arrow 58 for the sleeve 51. During these rotations, each notch 55 and 56 is partially occulted in succession by the facing conical bearing surface, as shown by the continuous lines in FIG. 11, or completed by the facing notch, as shown by the broken lines in the same figure. When the notches are partially occulted, they form the inclined strands of the diamond-shaped mesh cells of the lacunary structure shown [lacuna] FIG. 12 and when they are in coincidence with the facing notches they form the points of intersection of the mesh cells.

As in the embodiments of FIGS. 7 and 8, a temporary interruption in the rotation of the two sleeves 50 and 51 enables longitudinal strands to be obtained, giving a honeycomb-shaped mesh.

Figure 13:
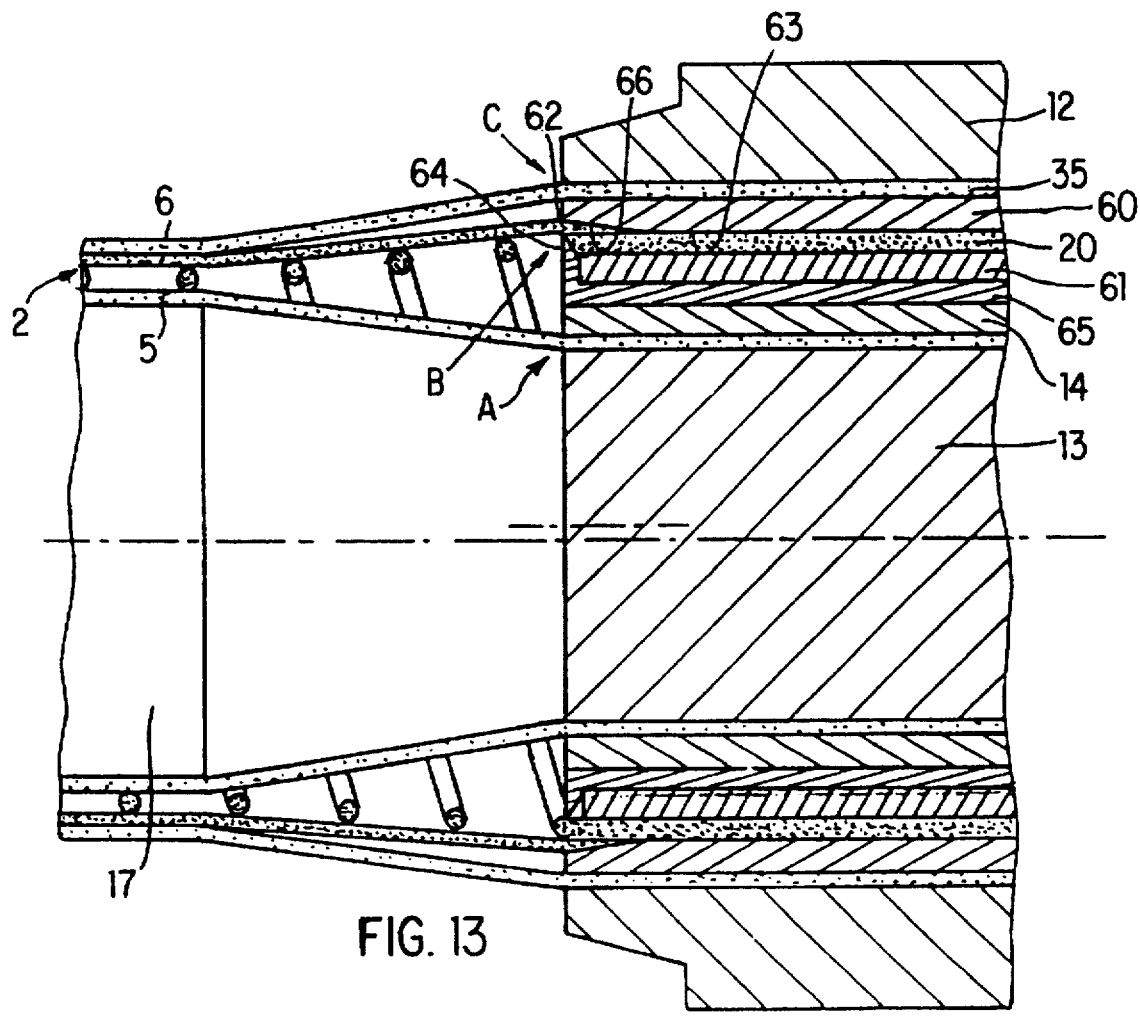
FIGS. 13 to 15 are views similar to those, 10 to 12, showing another embodiment of the die and the pipe.
Figure 14:
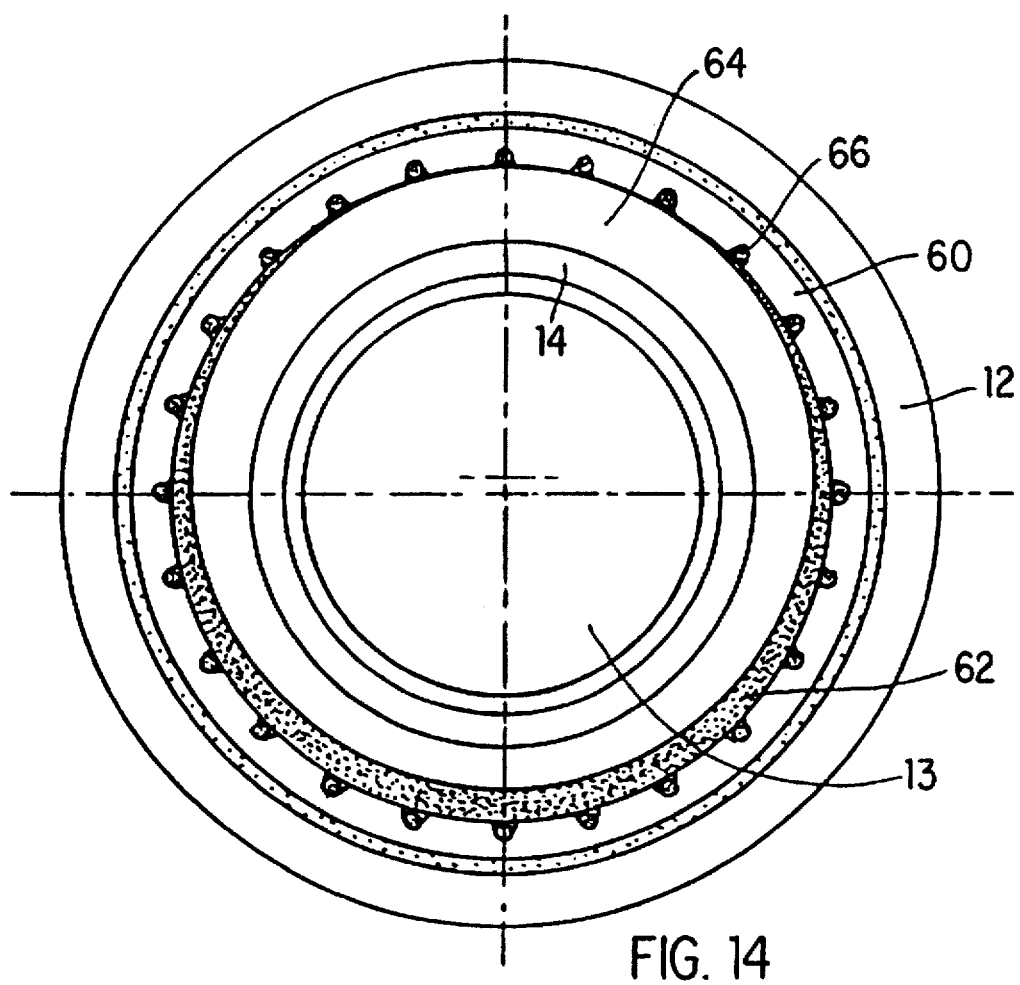

In FIGS. 13 and 14, the extrusion assembly B is composed of an outer sleeve 60 and an inner sleeve 61 coaxial with the previous one and delimiting, with it, the second annular channel 20. The extrusion annulus 62 is formed between the downstream end of the internal bore 63 of the sleeve 60 and the periphery of an annular knife 64. The knife has an external diameter smaller than the internal diameter of the bore 63 and is mounted at the end of a tubular support 65 with offsetting of its longitudinal axis in relation to that of this support. This support is placed inside the sleeve 61, between this sleeve and that one 14 of the first extrusion assembly A. The support is connected, via its upstream part, to means, not shown, capable of driving it rotationally about the sleeve 14. The outer sleeve 60 includes, at the downstream end of its internal bore, longitudinal blind notches 66 emerging into this bore and from the end of the sleeve (FIG. 14). These notches are spaced apart by a constant angular spacing.

Figure 15:
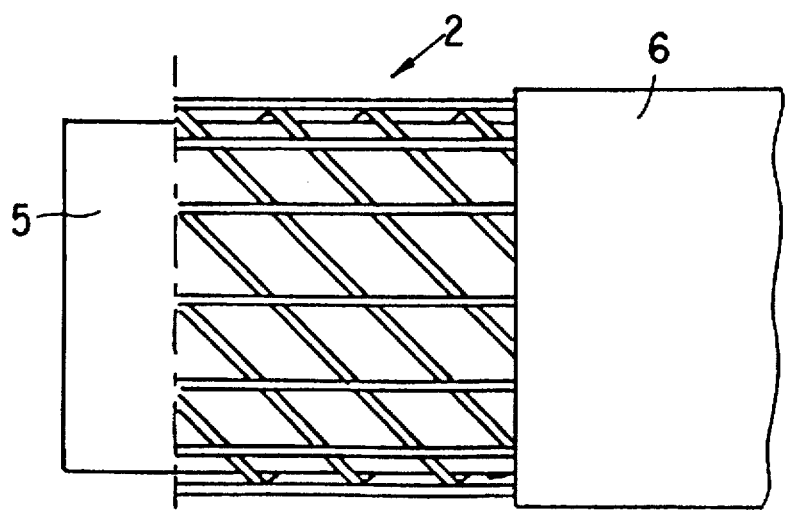

In operation, in the part of the annulus 62 where the annular knife 64 is in contact with the bore 63, as shown in the upper part of FIG. 14, only the notches 66 output longitudinal strands of material, whereas, in the opposite part of the annulus 62, the material is output by the notches 66, but also by the annulus 62 which, by the motion of the knife 64, forms a helical strand inside the imaginary cylinder delimited by the longitudinal strands. The lacunary structure thus obtained is shown in FIG. 15.

It will be noted that similar results may be obtained by producing the notches 66 on the periphery of the knife 64 and by providing the external sleeve 60 with a smooth bore over its entire length.

In an alternative form of this embodiment, the annular knife 64 is coaxial with its tubular support 65 which is then mounted so as to rotate freely on a bearing surface of the sleeve 14, this bearing surface itself being offset in relation to the longitudinal axis of this sleeve.

In another alternative form, with a knife 64 coaxial with the support 65, the support is mounted with radial clearance between the sleeves 14 and 61 and is connected to means capable of imparting to it a nutation, that is to say a substantially pendular motion moving the periphery of the knife against the bore 63 of the external sleeve 60.

Figure 16:
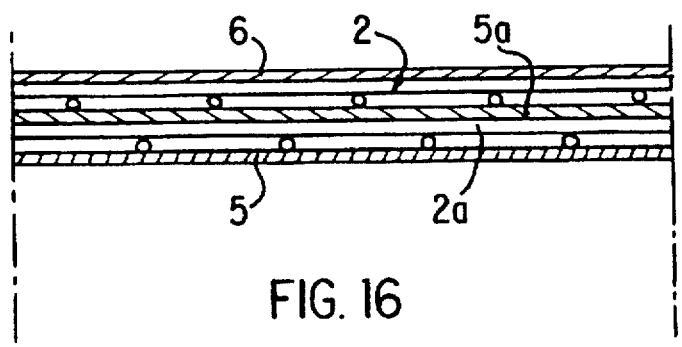
FIG. 16 is a partial sectional view, showing, on an enlarged scale, another embodiment of the multilayer pipe.

FIG. 16 shows an embodiment of a five-layer multilayer pipe. This pipe includes, between the strengthening reinforcement member 2, bonded to the outer ply 6 and the inner ply 5, an intermediate ply 5a and a second strengthening reinforcement member 2a. The intermediate ply 5a is bonded, by melting, to the second strengthening reinforcement member 2a which is, itself, bonded, by melting, to the inner ply 5.

The replacement of a single lacunary reinforcement member by two lacunary reinforcement members enables the transverse dimensions of the strands of the lacunary structures to be reduced. This has the advantage of transferring the quantity of heat accumulated in the strands, and in particular in those coming into contact with the respectively inner 5 and outer 6 plies and thus of facilitating the cooling of these plies. In practice, this multilayer structure prevents the formation of shrinkage zones visible on the surface of the plies and enables smooth and continuous surfaces to be obtained.

Preferably, the meshes of the two lacunary-structure strengthening reinforcement members 5 and 5a are offset, transversely and longitudinally, so that the points of intersection of one reinforcement member are between the mesh cells of the other reinforcement member and this is the case so as, on the one hand, to distribute the heat concentration zones on exiting from the die and, on the other hand, to improve the strength of the composite obtained.

Figure 17:
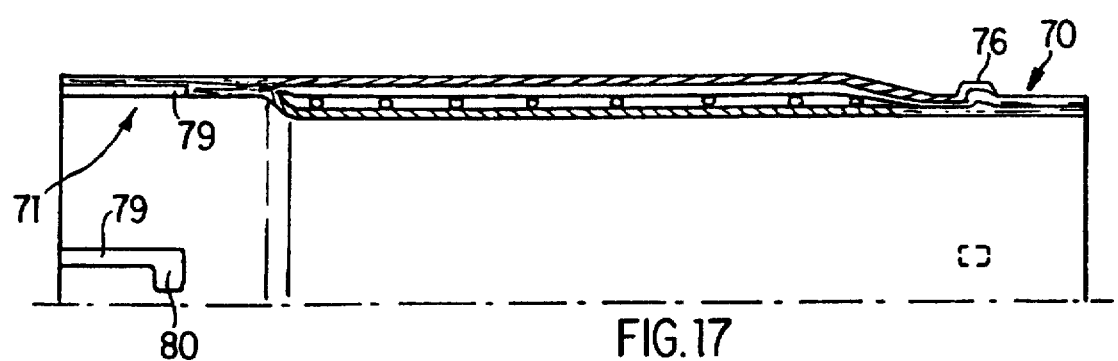
FIG. 17 is a partial longitudinal sectional view of a pipe equipped with a fitting endpiece and with a housing for an endpiece.

FIG. 17 shows a three-layer pipe obtained by cutting off into a length the product exiting from any one of the dies described hereinabove and shaped in order to allow its connection, by fitting, to an identical pipe. This pipe includes, at one of its ends, a fitting endpiece 70 and, at its other end, a housing 71 for receiving this endpiece.

The endpiece 70 has an outer diameter less than the outer one of the pipe, whereas the housing 71 has an inner diameter greater than the inner one of this same pipe and equal, to within the functional tolerance, to the outer one of the endpiece.

Figure 18:
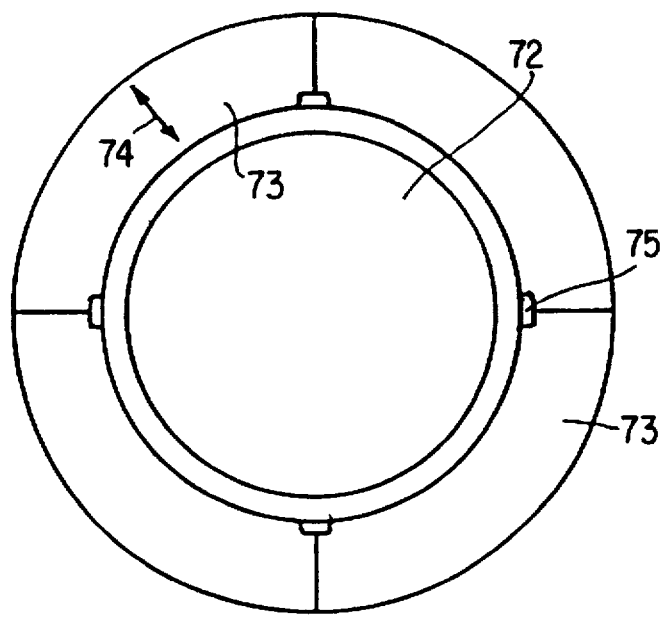
FIGS. 18 and 19 are front elevation views of the means for forming, respectively, the endpiece and the housing.

This endpiece 70 is obtained by raising the corresponding end of the pipe to a temperature at least equal to the softening point of the materials of which its layers are composed and by engaging it in the arrangement shown in FIG. 18, and composed of an axial ram 72 and jaws 73. The ram 72 has an inner diameter equal to that of the pipe. The jaws 73 can move radially, in the direction of the arrow 74, between a position in which they accept the engagement of the end of the pipe and an end-of-compression position. While they are being clamped onto the end of the pipe, they squash the component strands of the strengthening reinforcement member 2, thereby laminating them between the plies 5 and 6, which also undergo an at least partial lamination.

This compression-lamination is sufficiently strong to form, if this is necessary, and by means of molding cavities 75 made in the jaws, one or more tenons 76 projecting radially from the endpiece.

At the end of the operation, the endpiece is composed of a generally solid reinforced-wall.

Figure 19:
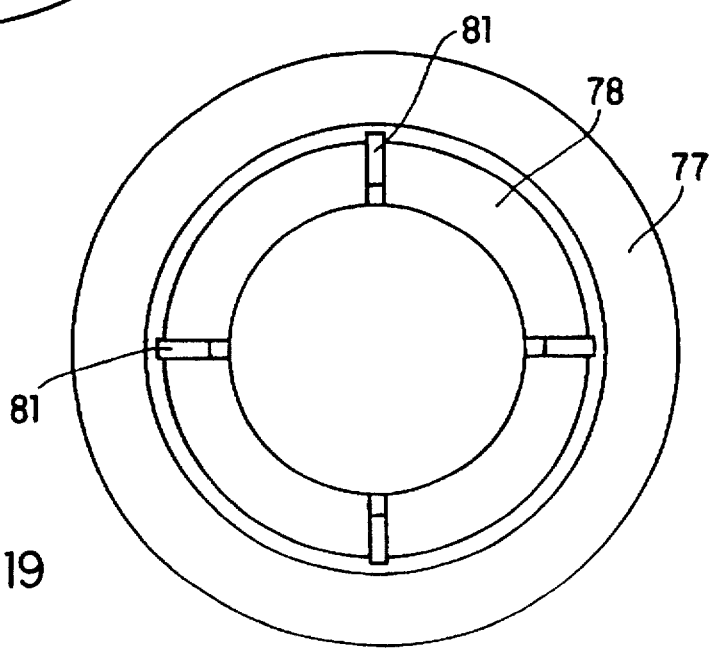

The preparation of the housing 71 is carried out under the same conditions, but by means of the arrangement shown in FIG. 19, and comprising an external collar 77 and an internal ram 78. The end of the pipe is engaged in the collar 77, which ensures its external sizing, like the ram 72 ensures the internal sizing of the endpiece 70. The end is deformed radially by insertion into its internal bore of the ram 78 which has an external diameter greater than the internal one of the pipe and equal to the internal one of the housing 71.

This radial force also causes the compression and the lamination of the strands of the strengthening reinforcement member 2 between the plies 5 and 6.

When the housing 71 is equipped with longitudinal grooves 79, with locking catch 80 for the tenons 76, these grooves and catches are formed by mold cavities 81 which can move radially in the ram 78 and are connected to means capable of moving them between a retracted position in the mandrel and a working position, in which they project from this mandrel and locally deform the reinforced wall produced at this end.

It will be noted, by virtue of its lacunae, that the strengthening reinforcement member 2 makes it possible to shape the ends of the pipe by using pressures which can be obtained by simple, reliable and inexpensive mechanical means, and to obtain, in the fitting zones not requiring deformability, rigid and strong walls promoting the connection of the pipes.

The possibility of producing, on the endpieces 70 and housings 71 while they are being formed, means 76, 79, 80 which subsequently ensure the positive connection of the various lengths, is particularly useful for pipes comprising an inner ply and/or an outer ply made from polyethylene, known to be difficult to join by adhesive bonding.

In an alternative form, the grooves 79 are in the form of helices. This arrangement makes it possible, by imparting a longitudinal thrust, for example by means of the shovel of a shovel loader, to the free end of a pipe, to impart to its other end the translational and rotational motion that favors the locking of tenons 76 in the notches 80. This arrangement is particularly advantageous for pipes that have a diameter greater than 400 mm and are difficult for just one man to be able to grasp.

The pipe according to the invention may be used for transporting gases, fluids, or sounds, but also for constituting a protective sheath for various mains or conductors. Whatever its application, for a strength equal to that of current pipes made from various materials, it is lighter in weight which makes it possible to envisage using it starting from very small diameters of the order of 30 mm up to diameters of the order of 1000 mm which, hitherto, could not be envisaged in lengths of pipe of standard length, on account of their weight.

We claim:

1. A multilayer pipe comprising at least one internal ply made from a first synthetic material, a strengthening reinforcement member made from a second synthetic material having a lacunary structure and one external ply made from a third synthetic material, in which at least one of the internal and external ply is bonded, by melting, to the reinforcement member, and wherein the strengthening reinforcement member has over at least part of its length, a lacunary structure which is reticulated, wherein at least one of internal and external faces of the strengthening reinforcement member is bonded continuously to adjacent plies and lacunary spaces of which are blocked off, but not filled, by the adjacent plies.

2. The pipe as claimed in claim 1, which possesses only one strengthening reinforcement member included between the internal and external plies and bonded thereto.

3. The pipe as claimed in claim 1, wherein the reinforcement member and one of the internal ply and the external ply to which the reinforcement member is bonded are produced from an identical synthetic material.

4. The pipe as claimed in claim 1, wherein at least one of the internal and external plies is produced from a synthetic material other than that of the reinforcement member.

5. The pipe as claimed in claim 1, wherein the lacunary-structure of the reinforcement member transitions to a generally solid layer of material at least one end of the pipe.

6. The pipe as claimed in claim 1, further comprising:

at one end thereof, a fitting endpiece of an outer diameter less than an outer diameter of the pipe, and having a reinforced wall formed by engagement of the one end, the one end being raised to the softening point of the materials constituting layers of the multilayer pipe, between an axial ram and radial outer jaws capable of compressing the pipe, thereby squashing and laminating the strengthening reinforcement member and the external ply against the internal ply; and at an opposite other end thereof, a housing for receiving the endpiece having an internal diameter greater than an internal diameter of the pipe and including a reinforced wall formed by engagement of the other end, the other end being raised to the softening point of the materials constituting the layers of the multilayer pipe and placed in an external collar of an axial ram capable of compressing the other end radially, thereby squashing and laminating the strengthening reinforcement member and the internal ply against the external ply.

7. The pipe as claimed in claim 6, wherein the endpiece includes at least one tenon projecting radially outward whereas the housing includes at least one groove that communicates with a transverse catch for locking the tenon.

8. The pipe as claimed in claim 1, further comprising, between the strengthening reinforcement member and the internal ply, an intermediate ply bonded, by melting, on one side to the reinforcement member and on an other side to a second lacunary reinforcement member, the second lacunary reinforcement member being itself bonded, by melting, to the internal ply.

9. The pipe as claimed in claim 8, wherein mesh cells of the second lacunary reinforcement member are offset laterally and transversely in relation to mesh cells of the first reinforcement member.

* * * * *